US012389053B1

(12) United States Patent
Clement et al.

(10) Patent No.: US 12,389,053 B1
(45) Date of Patent: Aug. 12, 2025

(54) PROACTIVE NETWORK MANAGEMENT BY A MODEL

(71) Applicant: Amazon Technologies, Inc., Seattle, WA (US)

(72) Inventors: Brendan William Leonard Clement, Seattle, WA (US); Kevin Ming Yan Chau, Long Island City, NY (US); Stephen Penney, Action, MA (US); Paul Martin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 18/127,511

(22) Filed: Mar. 28, 2023

(51) Int. Cl.
*H04N 21/24* (2011.01)
*H04N 21/25* (2011.01)
*H04N 21/262* (2011.01)

(52) U.S. Cl.
CPC ........... *H04N 21/24* (2013.01); *H04N 21/251* (2013.01); *H04N 21/26216* (2013.01)

(58) Field of Classification Search
CPC . H04N 21/26216; H04N 21/24; H04N 21/251
See application file for complete search history.

(56) References Cited

U.S. PATENT DOCUMENTS

| 2017/0054605 | A1* | 2/2017 | Duncan | H04L 41/145 |
| 2020/0099733 | A1* | 3/2020 | Chu | H04N 21/2402 |
| 2021/0084382 | A1* | 3/2021 | Kellicker | H04N 21/2407 |
| 2024/0187321 | A1* | 6/2024 | Juneja | H04L 43/16 |

* cited by examiner

*Primary Examiner* — Benjamin R Bruckart
*Assistant Examiner* — Alexander Boyd
(74) *Attorney, Agent, or Firm* — Nicholson De Vos Webster & Elliott LLP

(57) ABSTRACT

Techniques for a service provider network to identifying impacts affecting transmission of a live event to multiple client devices are discussed herein. A system can gather data from a variety of sources associated with the service provider network (e.g., a video service, a client device, a social media service, etc.) and identify patterns in network activity and/or user behavior that are indicative of a potential problem to deliver the live event. In some examples, the system can initiate a query for information associated with the potential problem, and output the query results to a model and/or a user interface for review. The system can, in various examples, determine an action to remedy the potential problem.

20 Claims, 7 Drawing Sheets

PROACTIVE NETWORK MANAGEMENT BY A MODEL

BACKGROUND

Cloud-based computing environments may provide many different types of services to subscribers, such as on-demand computing services, data-management services, software-execution services, application-hosting services, and various other types of services. Due to the ease of having the serverless computing environment provide and manage the computing infrastructure on behalf of subscribers, users continue to utilize cloud-based networks to provide and/or host services that are accessible over the Internet.

Some services may stream content to a customer over the Internet which can include using multiple networks to deliver the content to the customer. Due to the number of networks used to deliver the content, network failures can occur causing inefficient use of available computational resources and/or customer frustration due to people being unable to see, hear, or otherwise receive all the context available. In examples when the content is provided only over the Internet, problems with the network can interrupt delivery of the content.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
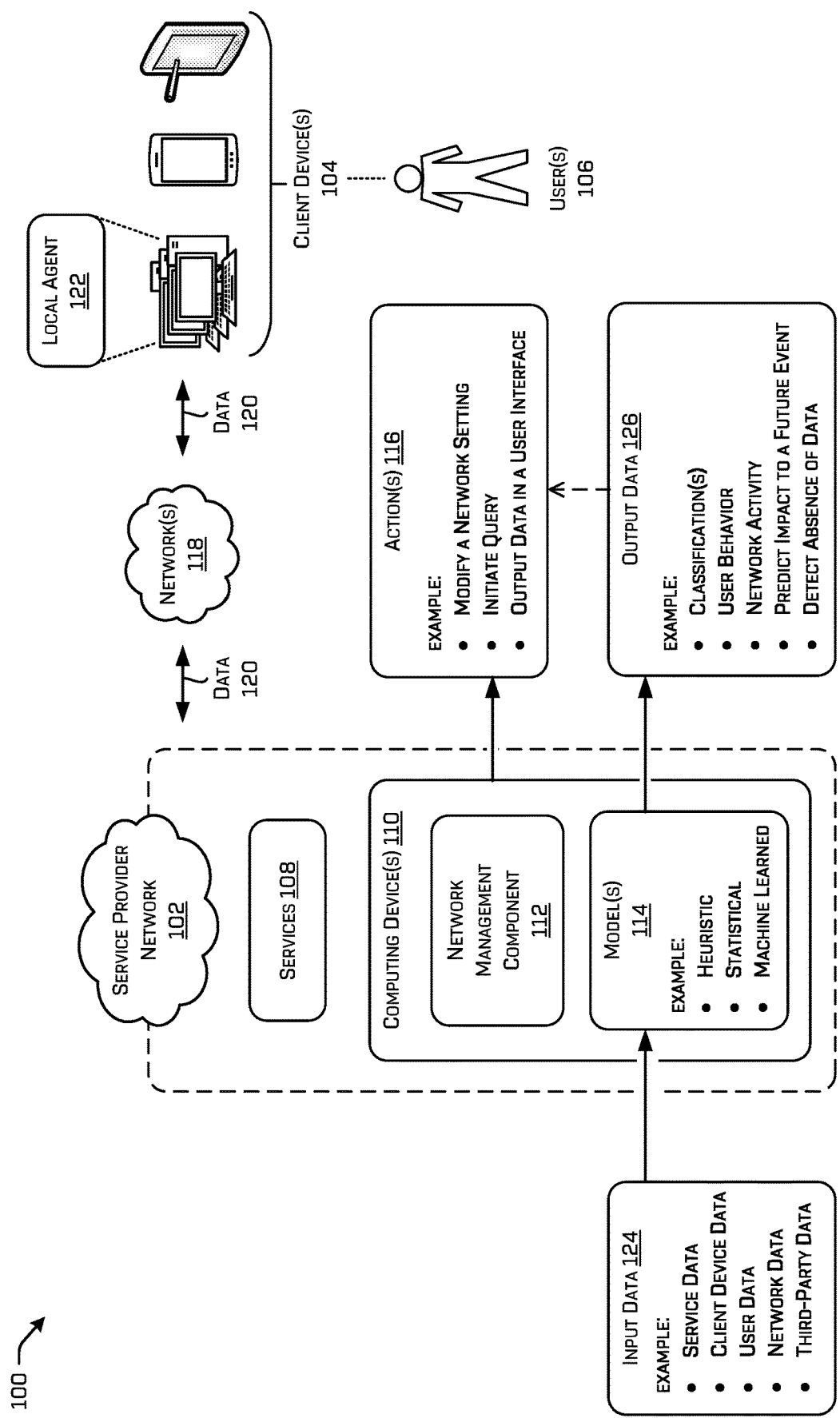
FIG. 1 illustrates a system-architecture diagram of an example environment for detecting and mitigating potential impacts to transmitting a live event using a service provider network.

This disclosure relates to techniques for identifying impacts to a service provider network that affect transmission of a live event to multiple client devices. A system can gather data from a variety of sources associated with the service provider network (e.g., a video service, a client device, a social media service, etc.) and identify patterns in network activity and/or user behavior that are indicative of a potential problem to deliver the live event. The potential problem may be representative of: a network that has failed prior to the live event, a user that has not logged in to receive the live event, or a number of devices accessing the live event, just to name a few. In some examples, the system can initiate a query for information associated with the potential problem, and output the query results to a model and/or a user interface for review. The system can, in various examples, determine an action to remedy the potential problem (e.g., identify another communication path, modify an amount of throughput to a network, and so on). The system can also or instead identify a false indication of a problem and take no action (e.g., detect false positives). By identifying patterns in network activity and/or user behavior over time as discussed herein, the system can proactively identify and remedy impacts to a future live event for transmission using the service provider network.

In various examples, the system can comprise a computing device configured to can gather and analyze data representing network activity and/or user information associated with the service provider network. For instance, the computing device can implement a model to sample data from multiple sources or entities associated with the service provider network. The entities of the service provider network may include one or more of: a service, a computing device, a client device, a Content Delivery Network, and/or a third-party service, just to name a few. The computing device can analyze the sampled data to identify a pattern of network activity and/or user interactions associated with a previous event (content, video, etc.) output by the service provider network. In various examples, the model can represent a machine learned model that is trained to sample the most relevant data from a dataset of the service provider network (e.g., data associated with entities of the service provider network such as other services, etc.). The model can identify relevant data based on which sources and/or data was associated with a previous network issue that caused an interruption during a previous event (e.g., a connection was lost or provided with variable quality).

A model can periodically sample new data from the dataset and identify changes in data exchanged between a service (e.g., a service providing the live event in the future) and a client device over time. The change in network activity can, for example, represent whether or not a particular client device is following steps to output the live event (e.g., signed-in, etc.) and/or a conversion rate for client devices to connect to a previous live event, just to name a few. A same or different model can analyze behavior of a user of the client device for different time periods (e.g., relative to activity associated with a service of the service provider network). By identifying changes in network and/or user behavior over time, the model can determine whether an absence of information (e.g., a failure to login) is indicative of a potential problem with a network or device and/or whether the potential problem is a false positive.

In some examples, a model can identify network activity (e.g., diagnostic information for one or more networks of devices) and/or user behavior relative to the service provider network transmitting video data to multiple client devices for a first time period, and further identify changes in the network activity and/or the user behavior for a second time period that impact delivery of a live event in the future. By implementing the techniques described herein, a service provider can output live events that improve a customer experience (e.g., avoids buffering, improves throughput to multiple devices collectively, improves the ability to sign-in or maintain a communication channel for receiving the live event). In some instances, the live event can be presented to a user on a display of a client device free of interruptions so that none of the live event is missed.

By way of example and not limitation, a service can provide a live event (e.g., data representing a real-world event taking place in real-time) to various devices via the service provider network and one or more third-party networks (e.g., an Internet provider). The service provider network may comprise clusters of managed servers stored in data centers located across geographic areas. The service provider network may be a distributed network through which users (often customers) may interact via respective client devices to manage or otherwise interact with services provided by the service provider network.

In some examples, the techniques can be employed before, during, and/or after a scheduled live event provided by a service using the service provider network. In other words, a model can continuously sample data prior to and throughout the live event (e.g., substantially real-time) to identify potential problems with transmitting data associated with the live event. Using the techniques described herein, a computing device can detect issues affecting presentation of the live event more quickly, and resolve the issues prior to and/or during a live event. For example, a model can apply heuristics to automatically adjust settings of a Content Delivery Network (e.g., to change throughput, etc.), or other entity of the service provider network to mitigate the network issue. Additionally, or alternatively, the action determined by the system can include outputting information about a network issue in a user interface of a computing device associated with a human that is trained to determine which steps to take, if any, to resolve the network issue. For example, the human can provide an input to the user interface indicating an action to alter throughput to different entities to provide a minimum threshold quality of the live event to the greatest number of client devices.

In various examples, a model can analyze user activity over time to generate a user profile detailing how the user interacts with a service, a client device, etc. For example, a model can sample data from various sources to generate a pattern of user behavior (e.g., a pattern of interactions, inputs, and/or actions by the user relative to a service or data provided therefrom) for a first time period. The pattern of user behavior can indicate, for example, which services the user typically interacts with prior to a live event. User activity can be related to a service that provides a previous live event and/or another service of the service provider network (e.g.., a social media service, a commerce service, etc.). The user profile can include information about how a user behaves prior to a live event to identify when the user is not logged in and may be experiencing a network problem. By way of example and not limitation, the live event can be a football game and data from the social media service can indicate that the user is a football fan. The user profile can further identify that the user logged into a previous football game ten minutes before the start of the program. In such examples, the model can detect when a user fails to log into a current live event a threshold time before it starts and initiate actions to validate whether a client device of the user is experiencing a problem with a network preventing the user from being able to login. Of course, user profiles can be generated at varying degrees of detail for different users. Thus, the model can monitor the service provider network for changes in user(s) behavior over time to find another communication channel to a client device of the user(s), or other action as discussed herein.

In a non-limiting example, the model can determine that multiple users are using a social media service to discuss a network problem local to a geographic region that is preventing them from receiving data associated with a current or upcoming live event. The model can validate the network problem (e.g., confirm a third-party network is not available, receive network diagnostic data indicated current health of one or more networks used to provide the live event, etc.) and take an action to correct and/or to circumvent the network problem. For example, the model can notify the third-party network provider of the problem and/or find another communication channel (e.g., a WiFi, Bluetooth, etc.) available to the client device (or another device associated with the user) to provide the live event to each client device. Additional details for proactively identifying and resolving potential issues with a service provider network are discussed throughout this disclosure including in relation to the figures below.

The systems and techniques disclosed herein can manage a network by employing a server, computing device(s), and/or a databases(s), etc. that collectively receive, determine, generate, and/or format image data and audio data associated with a live event. The server may, for example, implement a machine learned model trained to determine potential problems with a network (e.g., a network managed by the service provider or a third party network used to transmit data to and/or from respective client devices). The techniques described herein can improve the quality of data output in association with the live event (e.g., optimizing use of available network bandwidth and/or computational resources). In some examples, the techniques can be used to reduce an amount of data transmitted over a network in association with the live event. For instance, the techniques can improve network efficiency by proactively detecting network instances affecting the exchange of data with various devices, and determining an action for the service provider to enable for efficient use of available networks in various locations.

The system can represent or otherwise utilize a cloud platform that provides or hosts various types of services (also referred to as backend service). For instance, backend services may include business-application services, financial-institution services, healthcare services, and so forth. Client devices often interact or access these backend services over a network, such as the Internet, using Application Program Interface (API) calls that define an operation or interaction that the client device is requesting be performed. For example, an application or agent may be running locally on a client device to watch a video, make a purchase, etc. Data associated with the cloud platform can be used as input data to one or more models as described herein.

The system can employ a variety of different models to perform the techniques described herein. As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

Certain implementations and examples of the disclosure will now be described more fully below with reference to the accompanying figures, in which various aspects are shown.

However, the various aspects may be implemented in many different forms and should not be construed as limited to the implementations set forth herein. The disclosure encompasses variations of the examples, as described herein. Like numbers refer to like elements throughout.

FIG. 1 illustrates a system-architecture diagram of an example environment 100 for detecting and mitigating potential impacts to transmitting a live event using a service provider network. For example, a service provider network 102 can exchange data representing the live event (e.g., video of a real-world environment in real-time) with one or more client devices 104 associated with one or more users(s) 106. As shown, the service provider network 102 comprises services 108 and one or more computing device(s) 110 that further comprise a network management component 112 and one or more model(s) 114. In some examples, the computing device(s) 110 can be configured to determine an action(s) 116 for resolving a potential impact to the service provider network 102. In some examples, the client device(s) 104 can receive data 120 representing audio and/or video for presentation as part of the live event from the service 108 of the service provider network 102. For instance, the client device(s) 104 can include a local agent 122 representing an interface for outputting and/or receiving data to and/or from the user 106.

The model(s) 114 can receive a variety of input data 124 for processing, and determine output data 126 usable by the network management component 112 to determine the action 116. For instance, the computing device(s) 110 can implement the network management component 112 and/or the model(s) 114 to sample data, analyze the sampled data, and initiate the action 116 to ensure that the data 120 (e.g., a live football game or other content) from one or more of the services 108 reaches the client device(s) 104 at a minimum quality threshold (at or above a threshold value representing a minimum amount of data to transfer for the user 106 to receive the data 120). Though the network management component 112 and the model(s) 114 are shown separately for discussion purposes, functionality associated with the network management component 112 or the model(s) 114 can be included in the network management component 112, the model(s) 114, or another component of the service provider network 102.

In some examples, the service provider network 102 may comprise clusters of managed servers stored in data centers located across geographic areas. The service provider network 102 may be a distributed network through which users (often customers) may interact via the client device 104 to manage or otherwise interact with services 108 provided by the service provider network 102. The service provider network 102 may be managed by a service provider, and may provide various types of services 108, such as a video service, an on-demand computing service, a message-queuing service, a managed-database service, a software-execution service, application-hosting services, business-application services, financial-institution services, and/or other services. The services 108 may be a collection of computing resources configured to instantiate VM instances, containers, network functions, etc., and to provide other types of computing resources on demand. Other applications for the services 108 may be to support database applications, electronic commerce applications, business applications and/or other applications. The services 108 may include a service that configures data for different devices to receive a live event occurring in a real-world environment, and the computing device(s) 110 can identify potential problems with transmitting the data 120 associated with the live event.

The services 108 described above, and any other services, may be provided in one particular implementation by one or more data centers operated by the service provider. As known to those skilled in the art, data centers are facilities utilized to house and operate computing resources, such as computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet.

The computing resources associated with the services 108 can be provisioned and de-provisioned as needed in an automated fashion. For example, the service provider network 102 might be configured to instantiate a new instance of a computing resource, such as a VM instance, in response to an increase in demand for a network service or other condition. Other types of computing resources might also be provisioned and de-provisioned in a similar manner. Services 108 in the service provider network 102 might also provide functionality for automatically scaling and/or de-scaling the computing resources based upon demand for the resources and/or other factors.

The client device(s) 104 may represent any type of computing device capable of connecting to the service provider network 102 via a suitable data communications network 118 (e.g., a third-party network) such as, but not limited to, a laptop or desktop computer, a tablet computing device, a television, a server computer, a vehicle, or a mobile telephone, just to name a few. Administrative users employed by the operator of the service provider network 102, such as administrators managing the operation of the service provider network 102, might also connect with, manage, and utilize resources provided by the service provider network 102 in a similar fashion (e.g., using the computing device(s) 110).

According to the techniques described herein, user(s) 106 of the service provider network 102 may subscribe for an account with the service provider network 102 to utilize the computing infrastructure (e.g., computing resources in data centers) supporting the services 108 (e.g., memory, processing power, auto-scaling, networking and content delivery, etc.) provided for and managed by the service provider network 102. The service provider operating the service provider network 102 may charge a fee for utilization of the computing resources to a subscriber that have computing resources provisioned to support and use the services 108.

Generally, the user(s) 106 may interact via the local agent 122 to receive or employ a service from the services 108. The user(s) 106 may be one or more of individual users, groups of users, organizations, businesses, or other entities that interact with the service provider network 102 via respective client device(s) 104. In some examples, the local agent 122 can represent software that is associated with the services 108. The local agent 122 may also, or instead, represent a user interface having one or more controls (or input controls) for the user 106 to provide input usable by the network management component 112 to generate, update, or otherwise manage the service provider network 102. For instance, the user 106 can provide input to one or more controls of the local agent 122 to log into a service and/or provide preferences related to a presentation (e.g., the data 120) on a display device of the client device(s) 104.

In some examples, the network management component 112 can identify problems impacting a capability for the service provider network 102 to transmit the data 120 to another service, the client device 104, and/or another network, such as the network 118. The network management component 112 can monitor data exchanged over the service provider network 102 continuously, and aggregate data from various sources at different times. Additionally, or alternatively, the network management component 112 can determine when to initiate a model to sample data, such as a threshold time prior to a future event. In some instances, the network management component 112 may access a database (not shown) that stores data associated with a user (e.g., user behavior, user preferences, etc.) and/or stores historical network activity data usable for managing a network, as described herein.

As mentioned, the model(s) 114 (e.g., a machine learned model, a statistical model, heuristic model, or a combination thereof) can receive the input data 124 representing one or more of: service data associated with one or more services (e.g. the services 108), client device data associated with the client device 104, user data associated with a user profile, network data indicating network metrics of different networks, and third-party data associated with a third-party application or service, among others. The computing device(s) 110 can implement a first model to aggregate the input data 124 from the services 108, the client device 104, and/or a storage device that includes user information, etc. A second model can analyze the aggregated data to identify potential problems in the service provider network 102, the client device 104, and/or in the network(s) 118 that may cause the client device 104 to not receive the data 120 at a future time. For example, the model(s) 114 can generate the output data 126 which can represent one or more classifications (e.g., is performance by a particular network above a threshold, has a user logged into an event, etc.), a change in user behavior over time (e.g., is the user following a set of operations to access a live event, etc.), a change in network activity over time, a predicted probability of a current network instance impacting transmission of the data 120, and so on. Further discussion of functionality provided by the model(s) 114 can be found throughout this disclosure including in FIGS. 2 and 3.

In various examples, the action(s) 116 can be determined based at least in part on an output from the model(s) 114 (e.g., the output data 126 as indicated by a dashed arrow in FIG. 1). For example, the model(s) 114 can be configured to evaluate changes in behavior of the user(s) 106 over time for use in determining a setting of a network (e.g., a configuration of a server or other network element that increases or decreases capacity provided by the service provider network). In various examples, the model(s) 114 can identify a network (e.g., a Content Delivery Network) having less capacity at a current time compared to a previous time based on a number of users accessing (or not accessing) data via the network.

In some examples, the output data 126 can indicate that a potential problem exists, and a same or different model can automatically modify a network setting to correct the network problem. In other examples, the network management component 112 can configure the output data 126 (or a portion thereof) for output in a user interface to receive input from a human trained to determine whether or not to modify the network setting (e.g., evaluate the data for a false positive).

The action(s) 116 can include the network management component 112 initiating a query using a query system of the service provider. For example, the query can collect information associated with a potential impact to a future live event, and configure the query results for output in a user interface to present along with the output data 126. In some examples, a user can initiate a query by providing an input to a user interface of the computing device(s) 110, such as in response to reviewing the output data 126. In some examples, the query system can represent an interface for gathering information from one or more sources and may be employed to collect data surrounding a potential network incident.

In various examples, the model(s) 114 can represent a machine learned model that is configured to provide an interface (e.g., a chatbot, a user interface, etc.) on a display device of the computing device(s) 110 for interacting with the user 106. In this way, the user 106 can provide an indication of desirable information usable for determining an action and/or receive suggestions to mitigate the potential problem. For example, query results from executing one or more queries by the query system can be used to generate suggestions for output to in the user interface.

By identify changes in network activity and/or user behavior over time as discussed herein, the computing device(s) 110 can proactively identify and resolve impacts to a future event for transmission using the service provider network 102.

Figure 2:
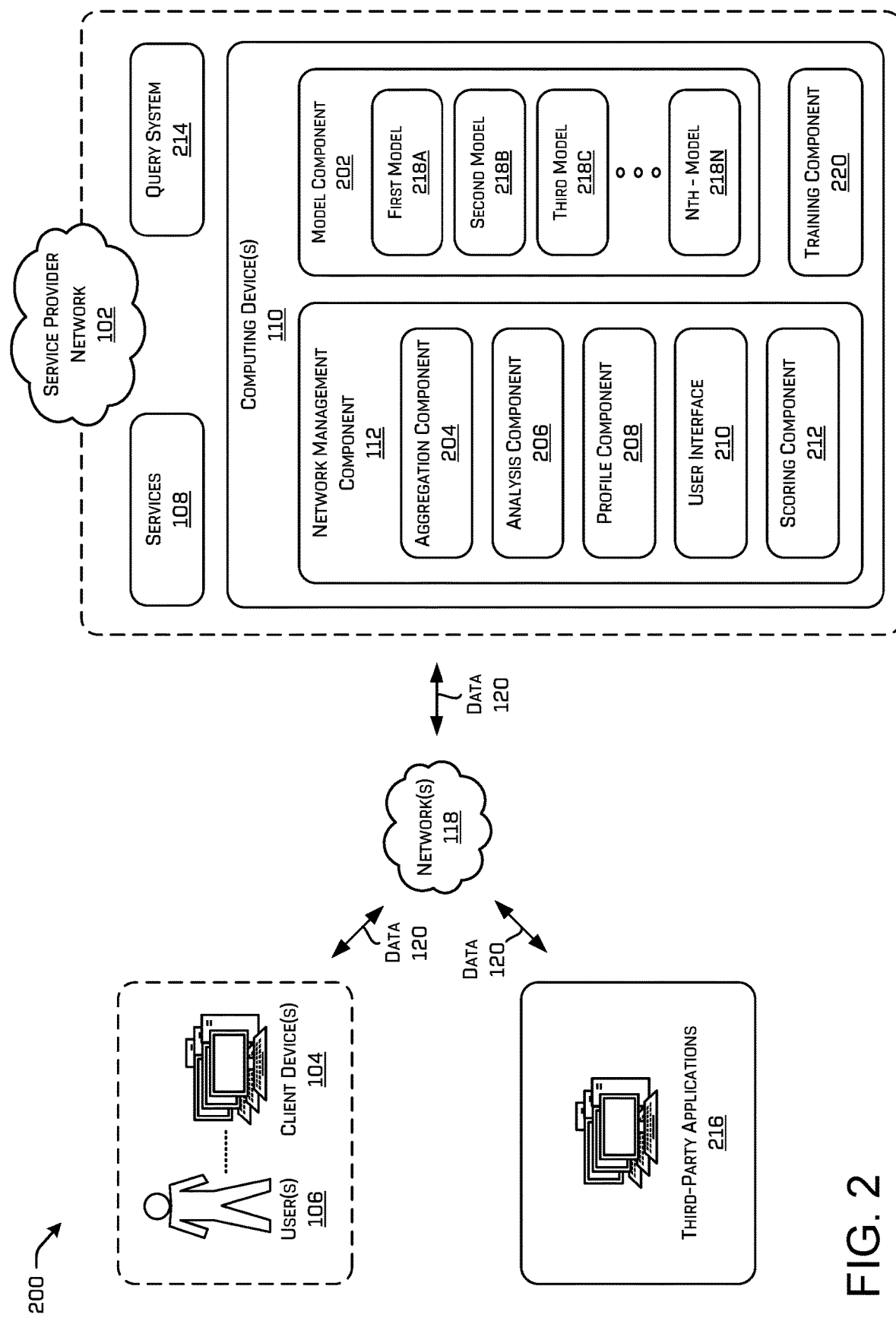
FIG. 2 illustrates a diagram of an example service provider network implementing example components to implement the techniques described herein.

FIG. 2 illustrates a diagram 200 of an example service provider network implementing example components to implement the techniques described herein. For example, the service provider network 102 can implement the computing device(s) 110 and the network management component 112 of FIG. 1. As shown in FIG. 2, the computing device(s) 110 comprises a model component 202, the network management component 112 which further comprises an aggregation component 204, an analysis component 206, a profile component 208, a user interface 210, a scoring component 212, and a query system 214. Though depicted in FIG. 2 as separate components of the network management component 112, the functionality associated with the aggregation component 204, the analysis component 206, the profile component 208, the user interface 210, the scoring component 212, and/or the query system 214 can be included in a different component of the service provider network 102 or the computing device(s) 110. In some instances, the components described herein may comprise a pluggable component, such as a virtual machine, a container, a serverless function, etc., that is capable of being implemented in any service provider network and/or in conjunction with any API gateway.

The diagram 200 further depicts the data 120 (e.g., data associated with a service of the service 108, data associated with a client device, etc.) being exchangeable with the client device(s) 104 associated with the user(s) 106 and third-party applications 216. For example, the network management component 112 can configure the data 120 for presentation by a display device of multiple client devices in different locations which can include utilizing a third party to present the data 120 on the client device 104. The network(s) 118 can represent multiple networks in the different locations, any one of which may fail and thus impact the data 120 reaching some of the client devices. Using the techniques described herein, the network management component 112 can maximize available network capacity across the networks used to transmit the data 120 as well as make efficient use of available computational resources (e.g., processor(s), memor(ies), etc.) to transmit the data 120 to the client devices across different geographical regions.

In some examples, the network management component 112 and/or the model component 202 (or models thereof) can receive the input data 124 for processing, and generate the output data 126. The network management component 112 can, in some examples, provide output data usable to determine a communication channel for various entities, applications, or components to exchange data in association with a live event over the network(s) 118. For example, the network management component 112 can initiate and maintain access to a window for output on a display device. In some examples, the network management component 112 can identify an API for exchanging the data 120.

As shown in FIG. 2, the model component 202 include one or more models, such as a first model 218A, a second model 218B, a third model 218C up to an Nth model 218N (collectively "models 218"), where N can be any integer greater than 1. The models 218 may be stored on, or otherwise accessible by, memory associated with the computing device(s) 110. The models 218 may represent machine learned models, statistical models, heuristic models, or a combination thereof, and may be implemented in association with a component of the computing device(s) 110. In various examples, the model component 202 can include at least the functionality associated with the model(s) 114.

In some examples, the first model 218A can represent a machine learned model trained to aggregate relevant data from a data set (e.g., a data set comprising data from a service, a backend service, a client device, a server, a data center, a CDN, and the like) associated with the service provider. Relevant data that may be indicative of a problem that is, or will, impact the transmission of the data 120, and may be selected based on criteria as further described elsewhere including in relation to the aggregation component 204. In various examples, a machine learned model associated with the model component 202 can be trained to detect, analyze, and otherwise interpret changes in user behavior and/or network activity over time.

The aggregation component 204 can represent functionality to sample, receive, collect, or otherwise determine data for processing by a component of the computing device(s) 110. In some examples, the aggregation component 204 can sample data based at least in part on criteria provided by a model and/or an input from a user (e.g., an administrator of the service provider). For instance, the criteria can identify a source(s) from which to sample data, a start time, an end time, etc. based on detecting previous problems to a network or device (e.g., a level of impact, scope of impact, types of devices or network entities affected, etc.) that impacted a previous presentation (e.g., reduced quality of delivered content, prevented transmission of the content, or the like). The criteria may also or instead identify a network entity (e.g., a service) for sampling data based on performance of the network entity at a previous time, a difference between the number of client devices accessing the previous presentation and an expected number of client devices, among others. In various examples, the aggregation component 204 can receive an instruction from another component or a user identifying the criteria for sampling the data. For instance, an instruction from the analysis component 206 can indicate which portions (e.g. which network, application, or device) of the service provider network 102 experienced a network problem that required mitigation to improve throughput. In this way, data can be sampled that is relevant for detecting a potential future problem in the service provider network 102.

Generally, the analysis component 206 can operate to analyze data associated with the service provider such as the sampled data from the aggregation component 204. The analysis component 206 can represent functionality to generate the output data 126 including, for example, determining a change in network activity associated with the client devices over time and/or a change in user behavior associated with multiple users over time. For example, sampled data can be analyzed for a first period of time to establish a first pattern of a user that can be used to compare to a second pattern of user behavior for a second period of time after the first period of time. By comparing the patterns of user behavior and/or network activity from different time periods, the analysis component 206 can identify a difference in an action by the user and/or a network that indicate a potential impact to delivering a live event in the future.

The analysis component 206 can, in various examples, determine a probability that the change in network activity and/or the change in user behavior impacts the service provider network 102 (or a network, computing device, or client device associated therewith). The probability can indicate a level of confidence of the potential impact occurring in the future, and can be thought of as a confidence value or "score" to the extent that the probability can be used for determining an action that mitigates the potential impact. For instance, the probability can be relatively high in examples when the analysis component 206 identifies a) a large number of potentially impacted entities (e.g., client devices, CDNs, data centers, etc.) or b) an importance of a particular geographic area receiving the particular content (e.g., the data 120), just to name a few.

The profile component 208 can be configured to store, access, or update user data associated with a user of a client device and/or network data associated with network behavior for different times. For example, the profile component 208 can store user data describing user behavior, user preferences regarding presentation of an event, and/or authentication information, just to name a few. In various examples, the profile component 208 can also or instead maintain a network profile that indicates network behavior for different periods of time (e.g., showing previous network problems, solutions, etc. for different times).

In some examples, the profile component 208 can store information associated with a user that can include information about multiple client devices with which the user can interact with content from the services 108. The user 106 can receive the data 120, for instance, via a television, a mobile phone, a desktop computer, or other device, and a profile can include information about previous user behavior and/or network activity associated with a particular device of the user. In this way, information can be available to another component or model for understanding or determining a potential network problem at a greater level of granularity (versus not implementing the profile component 208, for example).

Generally, the user interface 210 represents functionality for the service provider network 102 to interface with a user of a device via one or more programmable controls that convey information and/or optionally receive input. In various examples, the user interface 210 can be associated with the client device(s) 104 and/or the computing device(s) 110. In some examples, the user interface 210 can cause data to output on a display device of the client device(s) 104 to present content represented by the data 120. The user interface 210 may also present options (selectable controls, interfaces, and the like) for a user to initiate a show, manage user preferences, or otherwise receive the data 120. Outputs from various components or models can be presented in a respective user interface to implement the techniques described herein.

In some examples, the user interface 210 can be configured to present data associated with the service provider network 102 on a display device of the computing device(s) 110 to present a pattern associated with user behavior, a pattern associated with network activity, query results associated with a potential incident impacting operation of the service provider network 102, or other data usable for a user (e.g., an administrator) to determine an action relative to the potential incident (e.g., take no action, modify an entity of the service provider network, perform a query, aggregate additional data for a same or different time period, etc.).

The scoring component 212 can be configured to determine scores for devices, networks, or other entities for use in determining an action by a model or the administrator. In some examples, the network management component 112 can determine an action to modify the service provider network 102 based on the scores reflecting a relative importance of a network or device relative to another network or another device. As anonymous message-limiting example, scores associated with different CDNs can be evaluated to decrease throughput for a first CDN (while maintaining a minimum level of service) having a lower score than a second CDN to increase throughput for the second CDN to mitigate an incident preventing additional client device from accessing the second CDN to receive the data 120.

In various examples, the scoring component 212 can implement a model to determine a score indicating a relative importance of a network, device, data center, or the like which can be determined based at least in part on input from a user, or other criteria. For example, the scoring component 212 can determine a score for one or more of: a CDN, data center, a client device, and the like, based on an amount of data and/or type of data processed by the respective entity. A CDN serving a geographical area may process more data and/or may process more sensitive data and therefore have a higher score than another CDN. In some examples, a client device can receive a score based on the client device being located in a particular area and/or based on an amount of network activity associated with the client device. Data centers can also receive scores from the scoring component 212, in some examples, based on a list prioritizing the data centers by the area served, types of end user devices used to access a service, or other criteria.

As mentioned above, the analysis component 206 can determine a value (e.g., the probability of a potential impact) that represents a confidence, of "confidence score", that the impact occurs in the future. In some examples, the analysis component 206 can output a value indicating a confidence that the impact occurs (e.g., the probability at or above a threshold for impacting multiple client devices, etc.), and the scoring component 212 can determine scores for devices, networks, or other entities usable for determining an action to reduce the potential impact. For example, a relatively high confidence score can result in an action to output data in a user interface to receive user input to confirm or determine an action (e.g., to prevent an automated response impacting a large number of users), request additional information for validating the potential impact, etc. In some examples, a relative low confidence score (e.g., the probability below the threshold) can cause the analysis component 206 to automatically initiate an action to alter a setting of a network entity, or take some other action to address the potential impact.

In various examples, the service provider network 102 can implement a query system 214 to initiate, execute, and compile results for various queries. The computing device(s) 110 can implement the query system 214 to provide additional detail relative to information received as part of the aggregated data. If the aggregated data indicates a potential network issue, the query system 214 can be used to gather more detailed network information from one or more entities. In some examples, the query system 214 can target pre-determined network information that may be useful for understanding context of the potential incident.

The computing device(s) 110 can include a training component 220 to provide functionality to train a machine learning model to identify relevant data to sample, determine user behavior, determine network activity, or the like. In some examples, the training component 220 can include training data that has been generated by one or more machine learned models or components described herein. For example, the training component 220 can receive user information and network information associated with the output data 126 for use as training data. Third-party labeled training data can also or instead be used for training in various examples.

In some examples, the computing device(s) 110 can implement the training component 220 to improve detection of relevant data to sample, user behavior determinations, or another determination by a machine learned model discussed herein. In some examples, ground truth behaviors of the user over a time period may be determined (either hand labelled or determined by another machine learned model) and such ground truth behaviors may be used to determine a pattern of user behavior. Depending on the model being trained, ground truth can include a) examples of a normal user pattern of behavior and an abnormal user pattern of behavior to train a model to output a classification of whether monitored user behavior may be indicative of a network problem, b) patterns of network activity representing normal (or expected) activity and/or abnormal (or unexpected) activity, c) patterns of network activity indicating an occurrence and/or a non-occurrence of a false positive, and so on.

Figure 5:
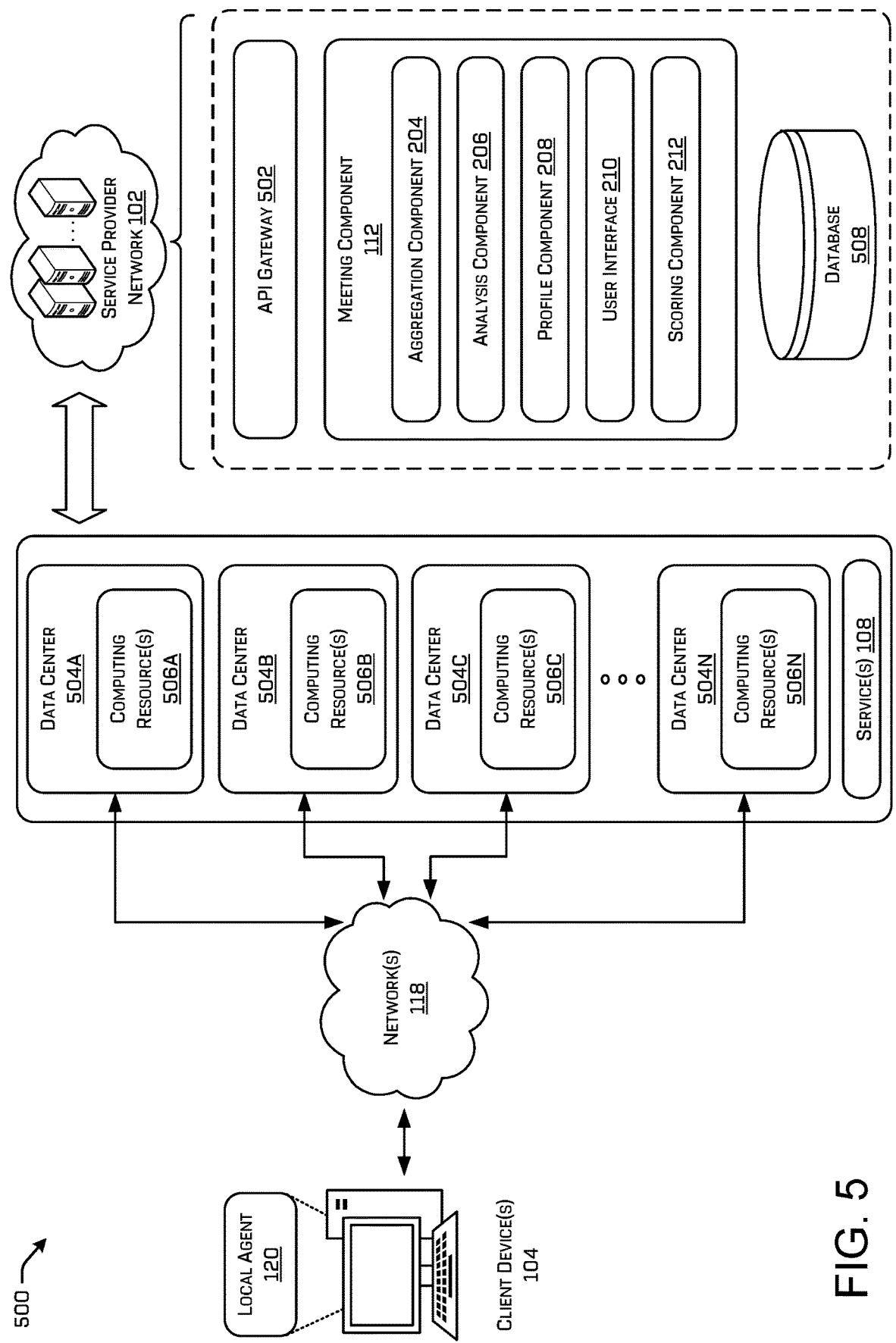
FIG. 5 illustrates a system and network diagram of an example operating environment that includes a service provider network for implementing the techniques described herein.

In various examples, one or more components (e.g., the profile component 208, etc.) can include or access a database (e.g., the database 508 of FIG. 5 or a database local to the computing device(s) 110), a container registry, a memory, or other storage device to store network data, user data, and other data usable for implementing the techniques discussed herein. Some stored data can be used as input data (or training data) into a model as described herein.

Figure 3:
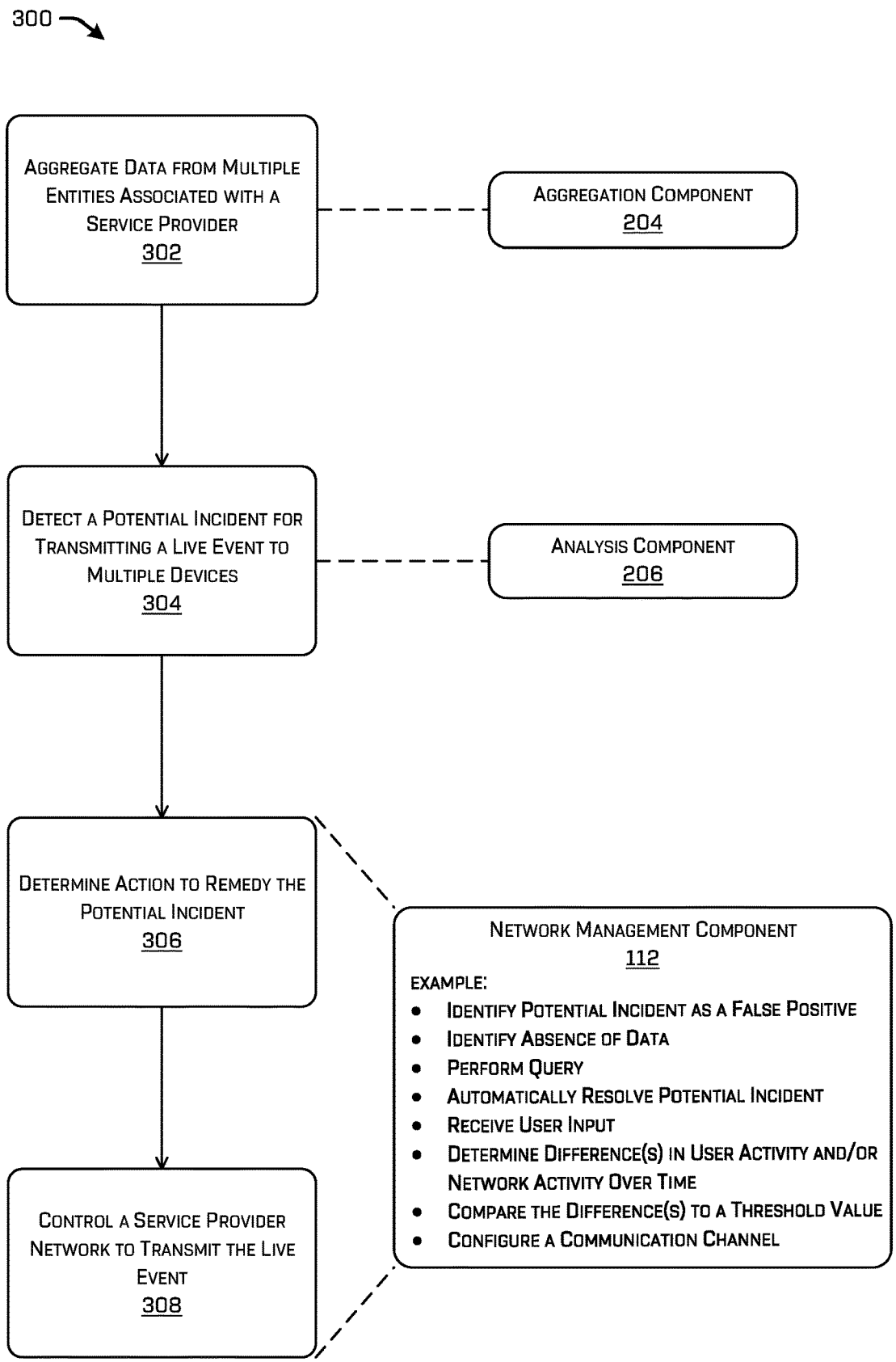
FIG. 3 is a pictorial diagram illustrating an example process by an example computing device to determine an action for a potential incident associated with a service provider network as described herein.

FIG. 3 is a pictorial diagram illustrating an example process 300 by an example computing device to determine an action for a potential incident associated with a service provider network as described herein. The example process 300 may be implemented by a computing device such as the computing device(s) 110 of FIG. 1 and FIG. 3.

An operation 302 can include aggregating data from multiple entities associated with a service provider. For example, the aggregation component 204 can receive data from two or more of: a service, a client device, a data center, or a network associated with the service provider, among others. In some examples, a model can identify a type or an amount of data to access from different entities of the service provider network 102. Due to the amount of data available, the model can identify relevant data than may affect network operation to sample the most useful available data for further processing. The aggregation component 204 can aggregate the data from a network, CDN, or other entity that experienced a network issue and/or device issue at a previous time.

An operation 304 can include detecting a potential incident for transmitting a live event to multiple devices. For example, the operation 304 can include the analysis component 206 analyzing the aggregated data to identify a change in user behavior and/or network activity from a previous time. The analysis component 206 can implement a machine learned model to determine first user behavior for a first time period (e.g., a previous time) based on inputs, preferences, data requested, or other activity of the user, and second user behavior based on activity represented by the aggregated data.

Additionally, or alternatively, the operation 304 can include a machine learned model determining the "health" of different networks used for transmitting the live event in the future by aggregating data from different networks serving different client devices in various geographical locations. The analysis component 206 can receive diagnostic information indicative of network performance, device performance, or a combination thereof, to identify whether a network or device is performing (e.g., exchanging data at a rate) below a minimum threshold value.

Detecting the potential incident can include the analysis component 206 determining, based on the aggregated data, first network data indicating a first pattern associated with a first service of the service provider network during an exchange of data with a client device for a first time period. The analysis component 206 can compare the first pattern with a second pattern associated with the first service exchanging data with the client device for a second time period different from the first time period to identify differences in network activity over time. In some examples, the analysis component 206 can compare patterns of user behavior over time to identify differences in user activity (e.g., including data absent from the second pattern which can indicate a potential incident).

An operation 306 can include determining an action to remedy the potential incident. For example, the operation 306 can include the network management component 112 determining whether the potential incident is a false positive and no action should be taken, or if further information is required before taking another action, such as modifying settings of an entity of the service provider network. In some examples, the action can include automatically initiating a change to the service provider network to mitigate the potential incident. A model can, for example, implement an algorithm to perform a tree search, or other rules-based technique for determining the action. The action can cause the service provider network to configure a communication channel for a maximum number of client devices in different locations.

In various examples, the network management component 112 can determine a probability of a potential impact to presentation of the live event provided over the service provider network at a future time. For example, a model can output a value representing a likelihood that the difference in network activity and/or user behavior impacts future transmission of the live event.

In various examples, the operation 306 can include the analysis component 206 comparing a value indicative of probability of a potential impact to a threshold value to determine the action. For example, based on the probability being below a threshold value, the analysis component 206 can initiate an action to modify an amount of data exchanged with one of: the client device, another client device, or a Content Delivery Network to reduce the probability of the potential impact to the live event. In examples when the probability is at or above the threshold value, the analysis component 206 can initiate a query to collect information associated with the potential impact to the live event and outputting a suggested action in a user interface of a computing device that is usable to reduce the probability of the potential impact to the live event.

An operation 308 can include controlling the service provider network to transmit the live event. For example, the operation 308 can include the network management component 112 generating an instruction to cause a setting or a configuration of the service provider network 102 to transmit data (e.g., the data 120) for each client device requesting the live event.

Figure 4:
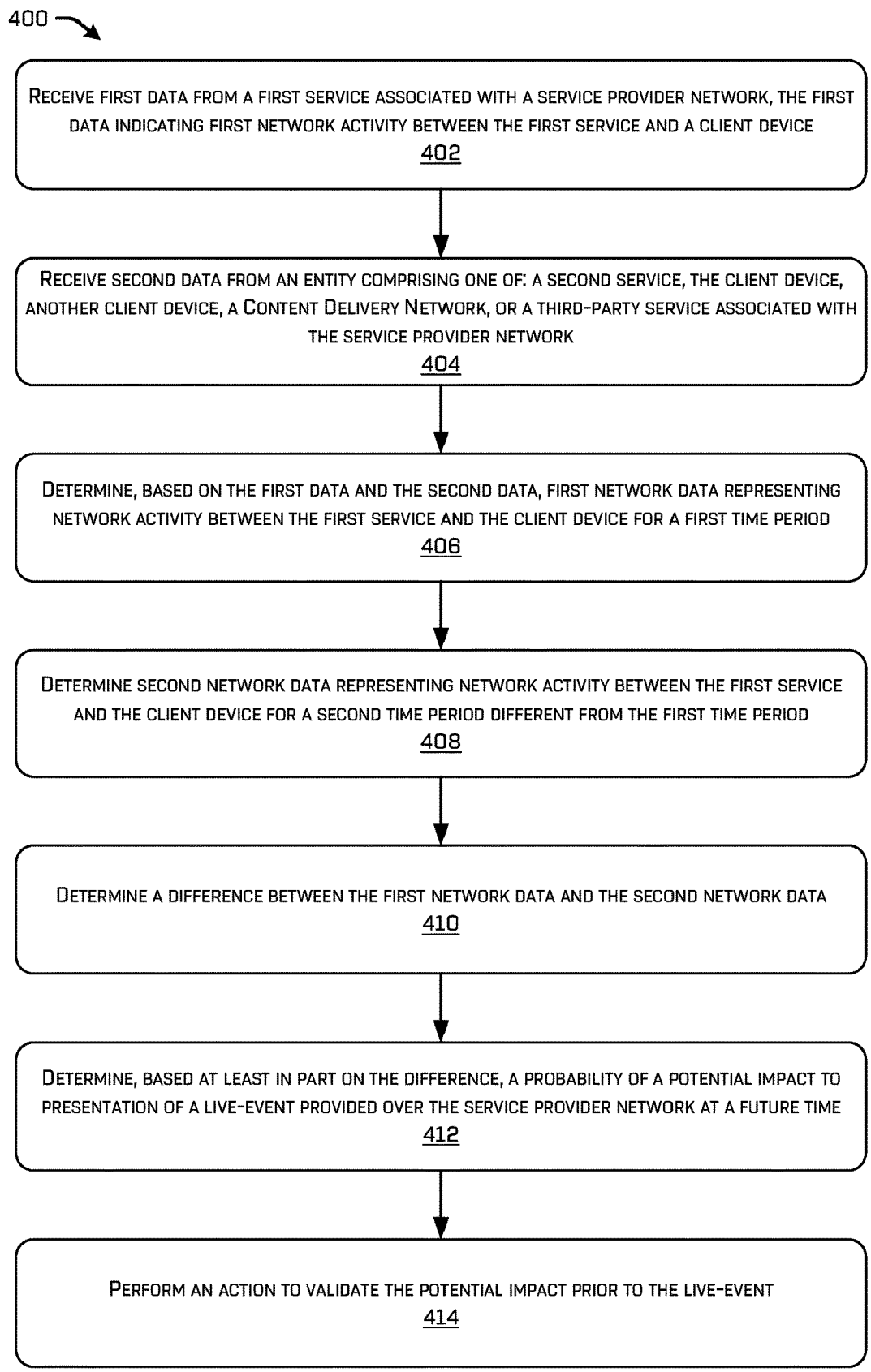
FIG. 4 is a flow diagram of an example method for determining a probability of an impact to a future event, and performing an action to reduce the impact prior to the event.

FIG. 4 is a flow diagram of an example method 400 for determining a probability of an impact to a future live event, and performing an action to reduce the impact prior to the event. For example, the service provider network 102 can identify impacts to providing a live event to multiple client devices. The service provider network 102 can implement the network management component 112, the model component 202, and/or the query system 214 to proactively mitigate the impact prior to a start of the live event, and in some cases, during the live event.

At 402, a service provider network may receive first data from a first service associated with a service provider network, the first data indicating first network activity between the first service and a client device. For instance, the network management component 112 can receive the input data 124 for processing. In some examples, the aggregation component 204 can sample the first data from one or more of the services 108.

At 404, the network management component 112 associated with the service provider network 102 may receive second data from an entity comprising one of: a second service, the client device, another client device, a Content Delivery Network, or a third-party service associated with the service provider network. The second data can represent network activity between the entity and the first service which is in addition to the first data to capture additional data from the service provider network 102 for processing.

At 406, the network management component 112 associated with the service provider network 102 may determine, based on the first data and the second data, first network data representing network activity between the first service and the client device for a first time period. At 408, the service provider network 102 may determine second network data representing network activity between the first service and the client device for a second time period different from the first time period. The operations 406 and 408 can include, for example, the analysis component 206 determining performance of different networks by analyzing the first and second data.

At 410, the service provider network 102 may determine a difference between the first network data and the second network data. The analysis component 206 can, for example, determine a change in performance of a particular network from a first time to a second time. A model can determine a representation of the first network activity and another representation of the second network activity, and compare the first and second representations to identify changes in network activity over time (e.g., data exchanged between a service and the client device).

At 412, the service provider network 102 may determine, based at least in part on the difference, a probability of a potential impact to presentation of a live event provided over the service provider network at a future time. The analysis component 206 can, for example, determine a probability of the difference indicating an incident that can impact transmission of the data 120.

At 414, the service provider network 102 may perform an action to validate the potential impact prior to the live event.

For example, the network management component 112 can initiate a query of the first data to identify a network instance that interrupted presentation of a previous live event on the client device during the first period of time, automatically modify a setting of a network element of the service provider network to reduce the probability of the potential impact to presentation of the live event, or output, in a user interface of a computing device, a representation of the difference between the first network data and the second network data to receive an input from the computing device indicating whether or not to take an additional action, just to name a few.

FIGS. 3 and 4 illustrate flow diagrams of example methods or processes that illustrate aspects of the functions performed at least partly by the service provider network 102 as described in relation to FIG. 1 and elsewhere. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some examples, the techniques of process 300 and/or the method 400 may be performed by a system comprising one or more processors and one or more computer-readable media storing computer-executable instructions that, when executed by the one or more processors, cause the one or more processors to perform the operations of the methods.

FIG. 5 illustrates a system and network diagram 500 of an example operating environment that includes a service provider network (that may be part of or associated with a cloud-based service network/platform) for implementing the techniques described herein. The service provider network 102 can include an API gateway 502 that may receive an API call and route the API call to a component or service. In various examples, the service provider network 102 can include the network management component 112 which comprises the aggregation component 204, the analysis component 206, the profile component 208, the user interface 210, and the scoring component 212.

The service provider network 102 can provide computing resources (e.g., computational resource(s) 506A, computational resource(s) 506B, computational resource(s) 506C up to an Nth computational resource(s) 506N (collectively "computational resources 506", where N can be any integer greater than 1) like VM instances, containers, serverless functions, storage, etc., on a permanent or an as-needed basis. Among other types of functionality, the computing resources 506 provided by the service provider network 102 may be utilized to implement the various cloud-based services. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. As shown, the service provider network 102 can include a database 508 for use in association with the meeting management techniques discussed herein. The service provider network 102 can also be configured to provide other types of computing resources not mentioned specifically herein.

The computing resources 506 provided by the service provider network 102 may be enabled in one example by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative example for a data center 504 that can be utilized to implement the technologies disclosed herein will be described below with regard to FIG. 7.

The data centers 504 may be configured in different arrangements depending on the service provider network 102. For example, one or more data centers 504 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The users and/or admins of the service provider network 102 may access the computing resources 506 provided by the data centers 504 of the service provider network 102 over any wired and/or wireless network(s) 118 (utilizing a client device 104 and/or another accessing-user device), which can be a wide area communication network ("WAN"), such as the Internet, an intranet or an Internet service provider ("ISP") network or a combination of such networks. For example, and without limitation, a device operated by a user of the service provider network 102 may be utilized to access the service provider network 102 by way of the network(s) 118. It should be appreciated that a local-area network ("LAN"), the Internet, or any other networking topology known in the art that connects the data centers 504 to remote clients and other users can be utilized. It should also be appreciated that combinations of such networks can also be utilized.

In a distributed computing environment, such as the one included in the service provider network 102 (e.g., computing-resource network), a fleet of VM instances and/or servers may have workflow or processes executed thereon to manage resources. For instance, a patch may need to be installed on each VM instance and/or resource at a particular time. In such distributed applications of workflows or processes, a load balancer may be at the front end in front of the fleet of servers where a request for a workflow comes in, and the load balancer distributes the request to execute the workflow amongst the servers.

Figure 6:
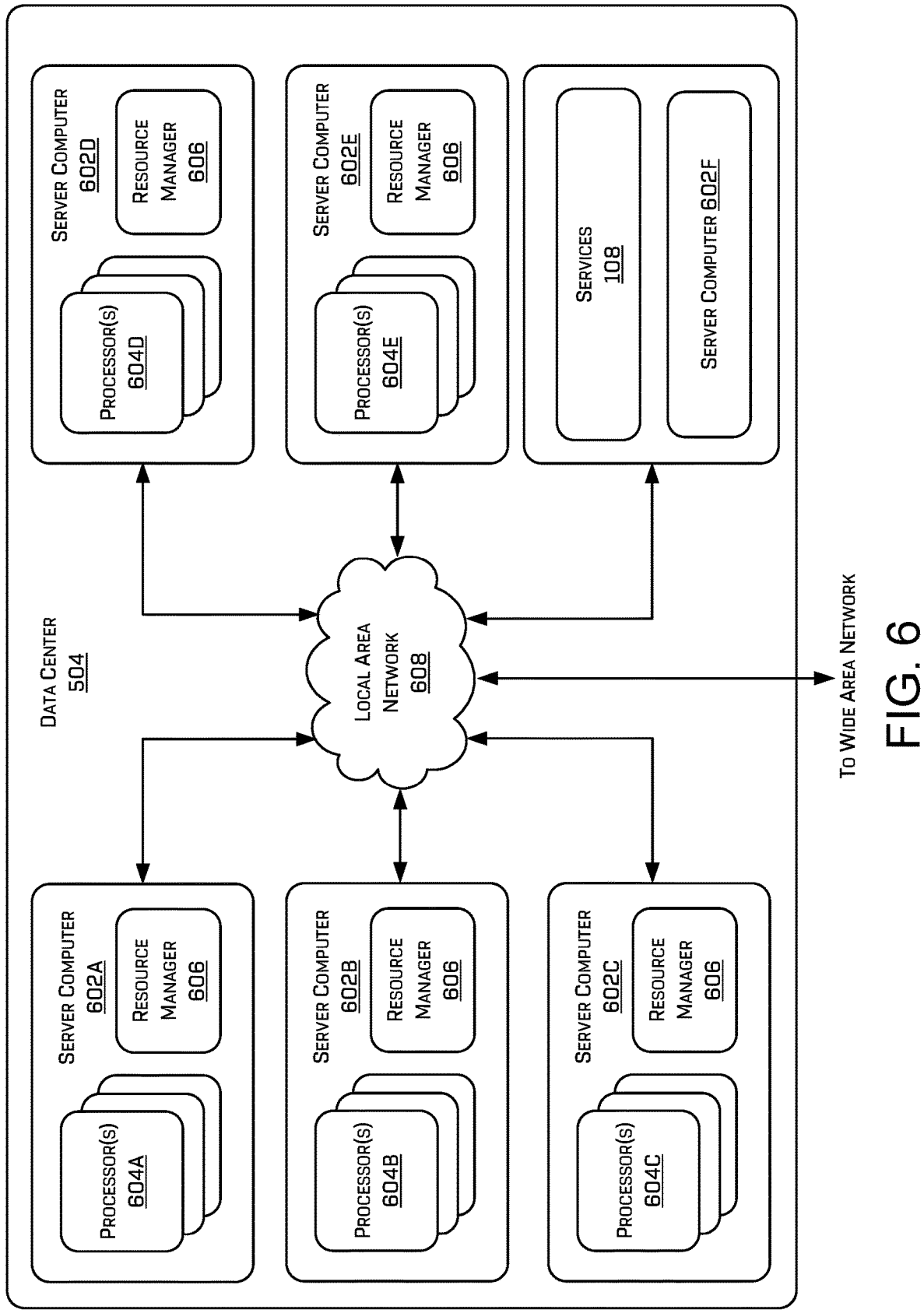
FIG. 6 is a diagram illustrating a configuration for an example data center that can be utilized to implement aspects of the techniques disclosed herein.

FIG. 6 is a diagram 600 illustrating a configuration for an example data center that can be utilized to implement aspects of the techniques disclosed herein. The example data center 504 shown in FIG. 5 includes several server computers 602A-602F (which might be referred to herein singularly as "a server computer 602" or in the plural as "the server computers 602") each having one or more processors 604A, 604B, 604C, 604D, and 604E. In some examples, the processor(s) 604 can represent a central processing unit (CPU), a graphics processing unit (GPU), a Tensor Processing Unit (TPU), an integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

The server computers 602 can be standard tower, rack-mount, or blade server computers configured appropriately for providing the computing resources described herein (illustrated in FIG. 6 as the processor(s) 604A-604E). As mentioned above, the computing resources provided by the service provider network 102 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 6.

The data center 504 shown in FIG. 6 also includes a server computer 602F that can execute some or all of the software components described above. For example, and without limitation, the server computer 602F can be configured to execute components of the service provider network 102, including the services 108.

In the example data center 504 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the server computers 602. It should be appreciated that the configuration of the data center 504 described with reference to FIG. 6 is merely illustrative and that other implementations can be utilized.

Figure 7:
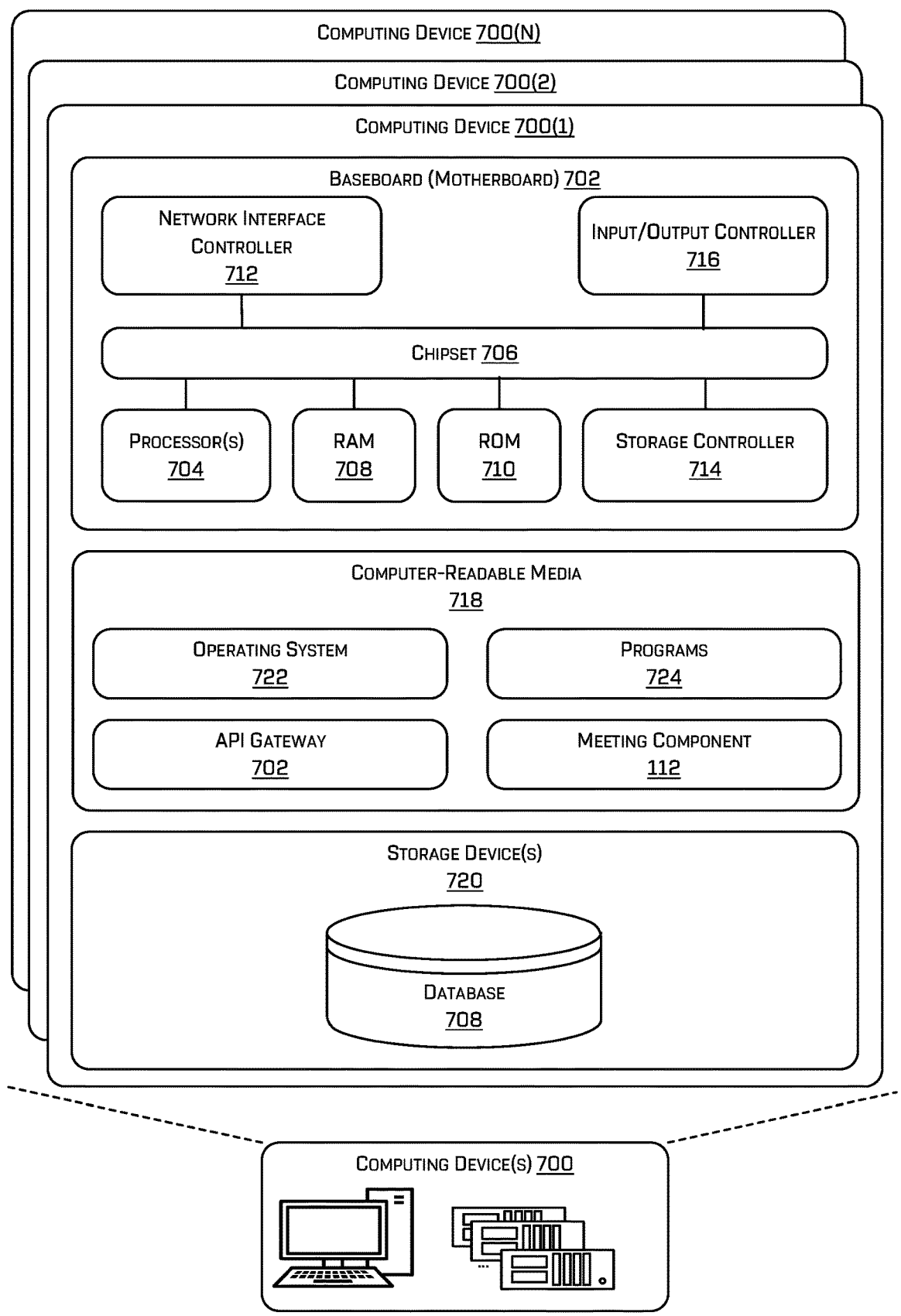
FIG. 7 is a computer architecture diagram showing an illustrative computer hardware architecture for implementing one or more computing devices to perform the techniques disclosed herein.

FIG. 7 is a computer architecture diagram showing an illustrative computer hardware architecture for implementing one or more computing devices 700 to perform the techniques disclosed herein. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computing device 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network 118. The chipset 706 can include functionality for providing network connectivity through a network interface controller (NIC 712), such as a gigabit Ethernet adapter. The NIC 712 is capable of connecting the computing devices 700 over the network 118. It should be appreciated that multiple NICs 712 can be present in the computing device 700, connecting the computer to other types of networks and remote computer systems.

The computing device 700 can be connected to one or more computer-readable media 718 storing software components for the computer device 700, and one or more mass storage devices 720 for storing data. The computer-readable storage media 718 can store an operating system 722, programs 724, the API gateway 502, and the network management component 112, which have been described in greater detail herein. The mass storage device 720 can be connected to the computing device 700 through a storage controller 714 connected to the chipset 706. The mass storage device 720 can consist of one or more physical storage units. The storage controller 714 can interface with the physical storage units through a Small Computer System Interface ("SCSI"), a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable storage media 718 may store the components described herein as executable, computer-readable instructions. For instance, the components may include the API gateway 502, the network management component 112, or components associated with the network management component 112. The components may be stored and/or executed on a single server, or on a system of two or more computing devices 700.

The computing device 700 can store data on the mass storage device 720 by transforming the physical state of the physical storage units to reflect the information being stored. The specific transformation of physical state can depend on various factors, in different examples of this description. Examples of such factors can include, but are not limited to, the technology used to implement the physical storage units, whether the mass storage device 720 is characterized as primary or secondary storage, and the like.

For example, the computing device 700 can store information to the mass storage device 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the mass storage device 720 by detecting the physical states or characteristics of one or more particular locations within the physical storage units.

In addition to the mass storage device 720 described above, the computing device 700 can have access to the computer-readable storage media 718 to store and retrieve information, such as program modules, event structures, or other data. It should be appreciated by those skilled in the art that computer-readable storage media is any available media that provides for the non-transitory storage of data and that can be accessed by the computing device 700. In some examples, the operations performed by the service provider network 102, and or any components included therein, may be supported by one or more devices similar to computing device 700. Stated otherwise, some or all of the operations performed by the service provider network 102, and or any components included therein, may be performed by one or more computer devices 700 operating in a cloud-based arrangement. As shown, the storage device 720 may store the database 508 that includes information about meeting data, sensor data, user profiles, and services as well as rules and access policies.

By way of example, and not limitation, computer-readable storage media 718 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disc ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 720 can store an operating system 722 utilized to control the operation of the computing device 700. According to one example, the operating system comprises the LINUX operating system. According to another example, the operating system comprises the WINDOWS® SERVER operating system from MICROSOFT Corporation of Redmond, Washington. According to further examples, the operating system can comprise the UNIX operating system or one of its variants. It should be appreciated that other operating systems can also be utilized. The mass storage device 720 can store other system or application programs and data utilized by the computing device 700.

In one example, the mass storage device 720 or other computer-readable storage media 718 is encoded with computer-executable instructions which, when loaded into the computing device 700, transform the computer from a general-purpose computing system into a special-purpose computer capable of implementing the examples described herein. These computer-executable instructions transform the computing device 700 by specifying how the CPUs 704 transition between states, as described above. According to one example, the computing device 700 has access to computer-readable storage media storing computer-executable instructions which, when executed by the computing device 700, perform the various processes described above with regard to FIGS. 1-7. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 8, can include other components that are not explicitly shown in FIG. 8, or might utilize an architecture completely different than that shown in FIG. 8.

In various examples, the service provider network may be part of or associated with a cloud-based service network that can be configured to implement aspects of the functionality described herein.

The service provider network 102 can provide computing resources, like physical servers, VM instances, containers, serverless functions, network functions, and storage, on a permanent or an as-needed basis. Among other types of functionality, the computing resources provided by the service provider network 102 may be utilized to implement the various services described above. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 504 (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A system comprising:
   one or more processors; and
   one or more non-transitory computer-readable media storing instructions executable by the one or more processors, wherein the instructions, when executed, cause the one or more processors to perform operations comprising:
   sampling a subset of data from a dataset associated with a service provider network, the dataset including information from one or more services, one or more client devices, and one or more Content Delivery Networks of the service provider network;
   determining, based on the subset of data, first network data indicating a first pattern associated with a first service of the service provider network exchanging first data with a client device for a first time period, the first pattern being indicative of one or more problems experienced in delivering an event provided over the service provider network during the first time period;
   determining second network data indicating a second pattern associated with the first service exchanging second data with the client device for a second time period, after the first time period, during which a live event is to be provided over the service provider network;
   determining a first difference between the first network data and the second network data;
   receiving historical data output by the client device over the first time period representing first user behavior associated with a previous live event, wherein the first user behavior comprises determining presence of a sign-in within a threshold amount of time from a start of the previous live event;
   determining, by a model, second user behavior of a user of the client device during the second time period;
   determining a second difference between the first user behavior and the second user behavior;
   determining, based on the first difference and the second difference, a probability of a potential impact to presentation of the live event at a future time that is during the second time period; and
   one of:
      based on the probability being below a threshold value, initiating an action to modify an amount of data exchanged with one of the client device, another client device, or a Content Delivery Network to reduce the probability of the potential impact to the live event; or
      based on the probability being at or above the threshold value, initiating a query to collect information associated with the potential impact to the live event and outputting a suggested action in a user interface of a computing device that is usable to reduce the probability of the potential impact to the live event.

2. The system of claim 1, the operations further comprising identifying network instances associated with a previous live event output by the service provider network to multiple client devices, the previous live event and the live event being a same event type, wherein sampling the subset of data from the dataset comprises sampling data from network entities associated with the network instances.

3. The system of claim 1, wherein the first difference between the first network data and the second network data indicates an absence of information in the second network data that is included in the first network data.

4. The system of claim 1, the operations further comprising:
outputting a representation of a difference between the first pattern associated with the first network data and the second pattern associated with the second network data in the user interface of the computing device;
initiating the query to collect information associated with the potential impact to the live event;
outputting the suggested action in the user interface; and
receiving an input from the computing device indicating whether or not the potential impact to the live event is a false positive.

5. The system of claim 1, wherein:
the first pattern represents a change in network throughput to each client device subscribed to a previous live event over the first time period, and
the second pattern represents a change in network throughput to each client device subscribed to the live event over the second time period.

6. A computer-implemented method comprising:
receiving first data from a first service associated with a service provider network, the first data indicating first network activity between the first service and a client device;
receiving second data from an entity comprising one of a second service, the client device, another client device, a Content Delivery Network, or a third-party service associated with the service provider network, the second data indicating second network activity between the entity and the first service;
determining, based on the first data and the second data, first network data representing the first network activity between the first service and the client device for a first time period, the first network activity being indicative of one or more problems experienced in delivering an event provided over the service provider network during the first time period;
determining second network data representing the second network activity between the first service and the client device for a second time period, different from the first time period, during which a live event is to be provided over the service provider network;
determining a first difference between the first network data and the second network data;
receiving historical data output by the client device over the first time period representing first user behavior associated with a previous live event, wherein the first user behavior comprises determining presence of a sign-in within a threshold amount of time from a start of the previous live event;
determining, by a model, second user behavior of a user of the client device during the second time period;
determining a second difference between the first user behavior and the second user behavior;
determining, based at least in part on the first difference and the second difference, a probability of a potential impact to presentation of the live event provided over the service provider network at a future time that is during the second time period; and
performing an action to validate the potential impact prior to the live event.

7. The computer-implemented method of claim 6, further comprising one of:
based on the probability being below a threshold value, modifying an amount of data exchanged with one of the client device, another client device, or a Content Delivery Network to reduce the probability of the potential impact to the live event; or
based on the probability being at or above the threshold value, initiating a query to collect information associated with the potential impact to the live event and determining a suggested action to reduce the probability of the potential impact to the live event based at least in part on query results of the query.

8. The computer-implemented method of claim 6, wherein performing the action comprises one of:
initiating a query of the first data to identify a network instance that interrupted presentation of a previous live event on the client device during the first time period;
automatically modifying a setting of a network element of the service provider network to reduce the probability of the potential impact to presentation of the live event; or
outputting, in a user interface of a computing device, a representation of the difference between the first network data and the second network data to receive an input from the computing device indicating whether or not to take an additional action.

9. The computer-implemented method of claim 6, further comprising:
identifying a first network instance associated with a previous live event output by the service provider network to multiple client devices, the previous live event and the live event being a same event type; and
identifying a second network instance associated with content output by the service provider network to at least some of the multiple client devices during the second time period, wherein determining the probability is further based at least in part on an amount of similarity between the first network instance and the second network instance.

10. The computer-implemented method of claim 6, wherein the difference between the first network data and the second network data indicates an absence of information in the second network data that is included in the first network data.

11. The computer-implemented method of claim 6, wherein performing the action comprises initiating a query to collect information associated with the potential impact to the live event, and the method further comprising configuring query results associated with the query for output in a user interface.

12. The computer-implemented method of claim 6, wherein the one or more problems correspond to at least one of a connection of devices to the service provider network during the event or a quality of streaming of the event.

13. The computer-implemented method of claim 6, wherein the difference between the first network data and the second network data comprises a difference in a first network throughput to multiple client devices during the first time period and second network throughput to the multiple client devices during the second time period.

14. The computer-implemented method of claim 6, wherein:
  the action to validate the potential impact includes to modify an amount of data exchanged with one of the client device, another client device, or a Content Delivery Network including:
  increasing or decreasing the amount of data available to the Content Delivery Network based at least in part on a score of the Content Delivery Network relative to scores of other Content Delivery Networks to output the live event at the future time.

15. One or more non-transitory computer-readable media storing instructions that, when executed, cause one or more processors to perform operations comprising:
  receiving first data from a first service associated with a service provider network, the first data indicating first network activity between the first service and a client device;
  receiving second data from an entity comprising one of a second service, the client device, another client device, a Content Delivery Network, or a third-party service associated with the service provider network, the second data indicating second network activity between the entity and the first service;
  determining, based on the first data and the second data, first network data representing the first network activity between the first service and the client device for a first time period, the first network activity being indicative of one or more problems experienced in delivering an event provided over the service provider network during the first time period;
  determining second network data representing the second network activity between the first service and the client device for a second time period, different from the first time period, during which a live event is to be provided over the service provider network;
  determining a first difference between the first network data and the second network data;
  receiving historical data output by the client device over the first time period representing first user behavior associated with a previous live event, wherein the first user behavior comprises determining presence of a sign-in within a threshold amount of time from a start of the previous live event;
  determining, by a model, second user behavior of a user of the client device during the second time period;
  determining a second difference between the first user behavior and the second user behavior;
  determining, based at least in part on the first difference and the second difference, a probability of a potential impact to presentation of the live event provided over the service provider network at a future time that is during the second time period; and
  performing an action to validate the potential impact prior to the live event.

16. The one or more non-transitory computer-readable media of claim 15, the operations further comprising one of:
  based on the probability being below a threshold value, modifying an amount of data exchanged with one of: the client device, another client device, or a Content Delivery Network to reduce the probability of the potential impact to the live event; or
  based on the probability being at or above the threshold value, initiating a query to collect information associated with the potential impact to the live event and determining a suggested action to reduce the probability of the potential impact to the live event based at least in part on query results of the query.

17. The one or more non-transitory computer-readable media of claim 15, wherein performing the action comprises one of:
  initiating a query of the first data to identify a network instance that interrupted presentation of a previous live event on the client device during the first time period;
  automatically modifying a setting of a network element of the service provider network to reduce the probability of the potential impact to presentation of the live event; or
  outputting, in a user interface of a computing device, a representation of the difference between the first network data and the second network data to receive an input from the computing device indicating whether or not to take an additional action.

18. The one or more non-transitory computer-readable media of claim 15, wherein the difference between the first network data and the second network data indicates an absence of information in the second network data that is included in the first network data.

19. The one or more non-transitory computer-readable media of claim 15, the operations further comprising:
  identifying a first network instance associated with a previous live event output by the service provider network to multiple client devices, the previous live event and the live event being a same event type; and
  identifying a second network instance associated with content output by the service provider network to at least some of the multiple client devices during the second time period, wherein determining the probability is further based at least in part on an amount of similarity between the first network instance and the second network instance.

20. The one or more non-transitory computer-readable media of claim 15, wherein performing the action comprises initiating a query to collect information associated with the potential impact to the live event, and the method further comprising configuring query results associated with the query for output in a user interface.

* * * * *